United States Patent [19]
Carlson et al.

[11] Patent Number: 5,306,438
[45] Date of Patent: Apr. 26, 1994

[54] IONIC DYE-BASED ELECTRORHEOLOGICAL MATERIALS

[75] Inventors: J. David Carlson; Keith D. Weiss, both of Cary, N.C.; Joseph E. Bares, Bartlesville, Okla.

[73] Assignee: Lord Corporation, Erie, Pa.

[21] Appl. No.: 806,981

[22] Filed: Dec. 13, 1991

[51] Int. Cl.$^5$ ................. C10M 169/04; C10M 171/00
[52] U.S. Cl. ........................................ 252/74; 252/73; 252/75; 252/76; 252/572; 8/521
[58] Field of Search ................. 252/73, 74, 75, 76, 252/572; 8/521

[56] References Cited

U.S. PATENT DOCUMENTS

| | | | |
|---|---|---|---|
| 3,484,162 | 12/1969 | Clark | 355/3 |
| 3,553,708 | 1/1971 | Carreira et al. | 346/1 |
| 4,554,555 | 11/1985 | Aruga et al. | 106/20 |
| 4,687,589 | 8/1987 | Block et al. | 252/73 |
| 4,962,039 | 10/1990 | Benedyk | 436/40 |
| 5,061,388 | 10/1991 | Nader | 252/47 |
| 5,118,431 | 6/1992 | Nader | 252/49.9 |

FOREIGN PATENT DOCUMENTS 1-275699 11/1989 Japan.
2-150461 6/1990 Japan.

Primary Examiner—Christine Skane
Attorney, Agent, or Firm—W. Graham Buie

[57] ABSTRACT

An electrorheological material containing a carrier fluid and an ionic dye particle component which is an ionically charged compound based on or derived from a conjugated hydrocarbon compound. A preferred ionically charged compound contains at least one aromatic nucleus that has been sulfonated and/or carboxylated to form a negatively charged system which has, in turn, been offset with a positive ion. The electrorheological material is useful for creating aesthetic visual effects and responds quickly to an electric field.

17 Claims, 4 Drawing Sheets

- Ionic Dye Materials

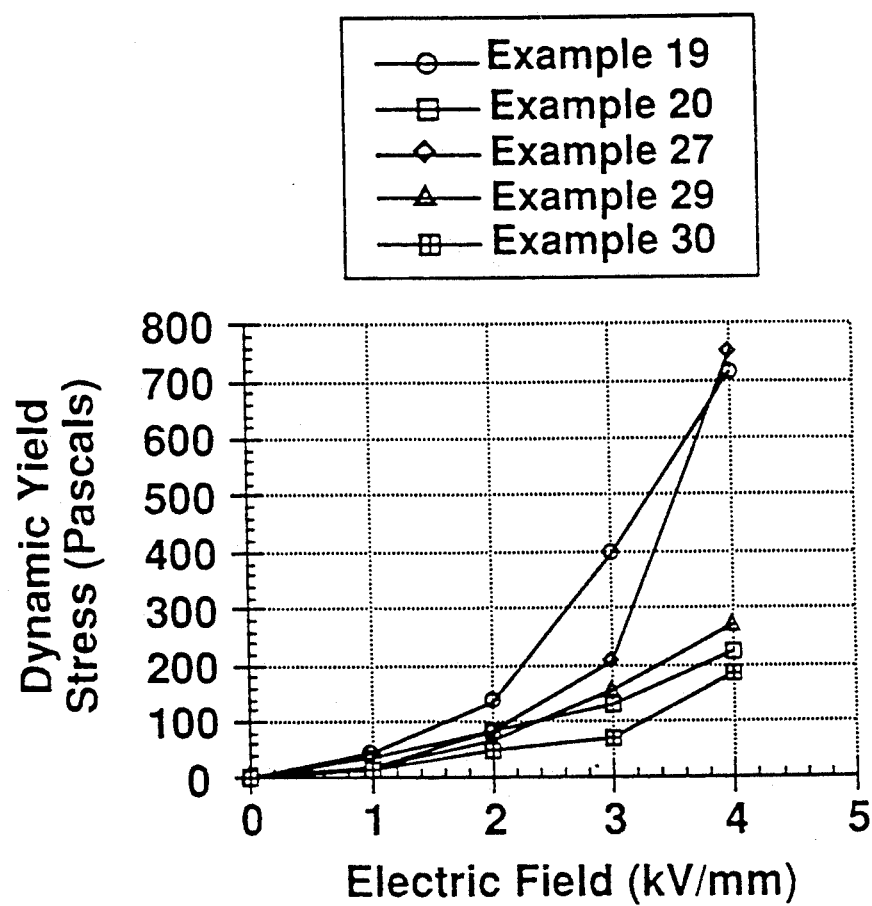
Figure 1(A) - Ionic Dye Materials

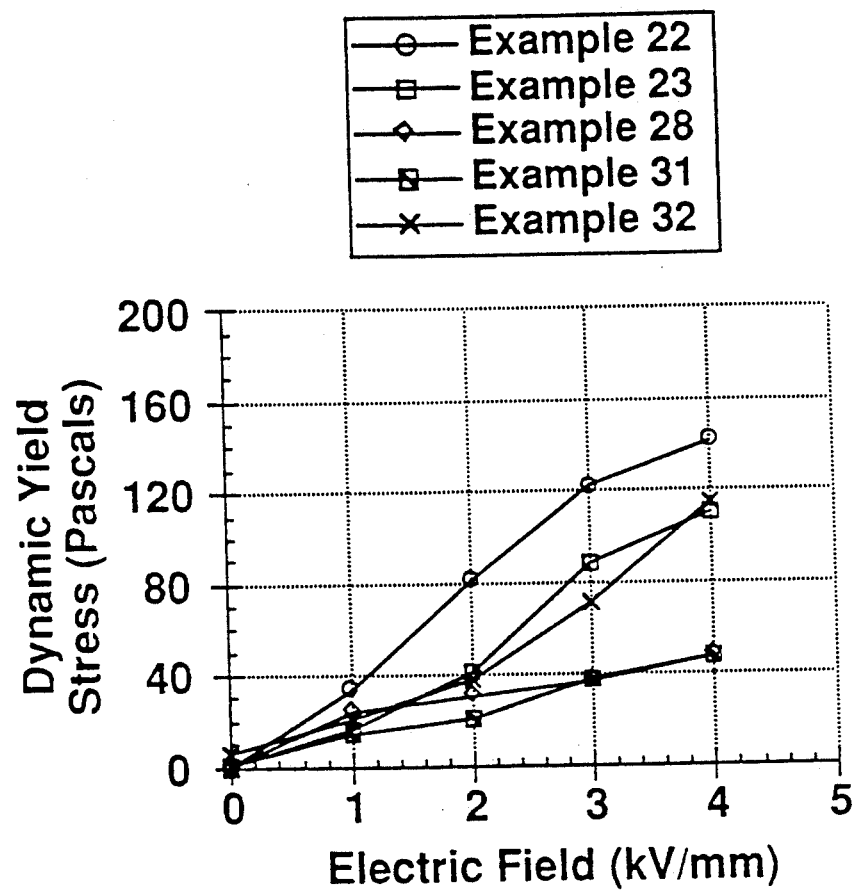
Figure 1(B) - Non-ionic Dye Materials

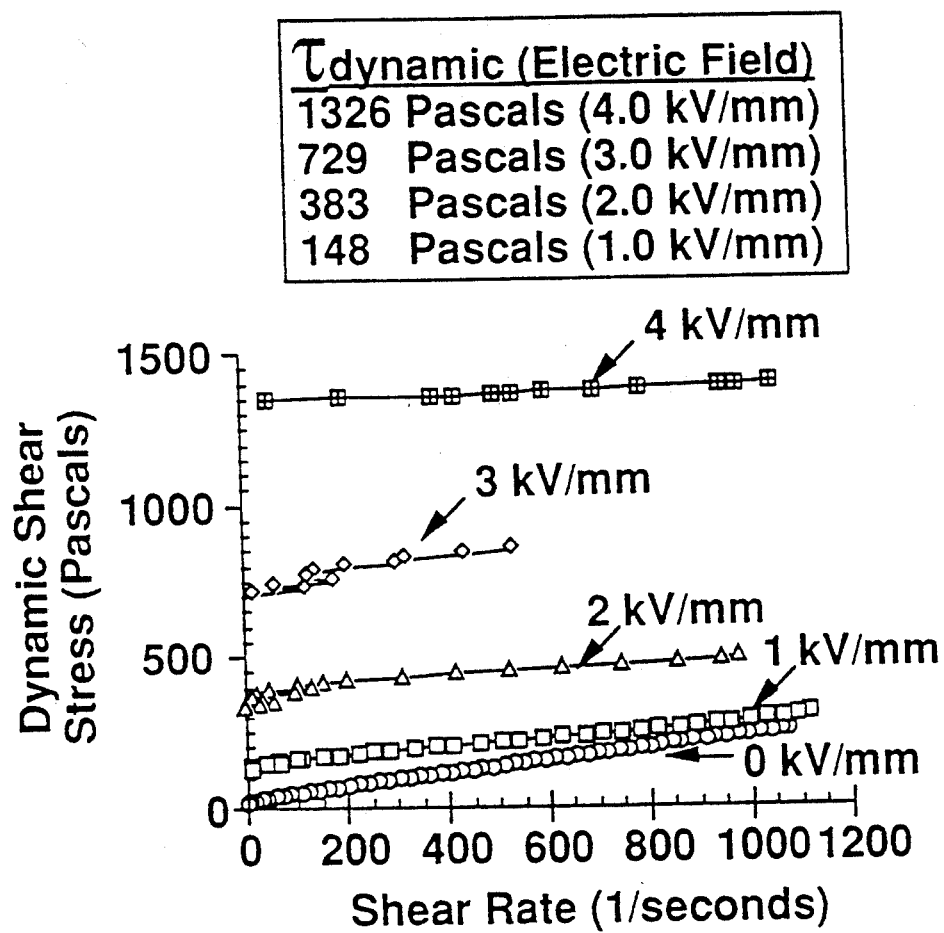
Figure 2(A) - Ionic TSAS -Based Material (Example 33)

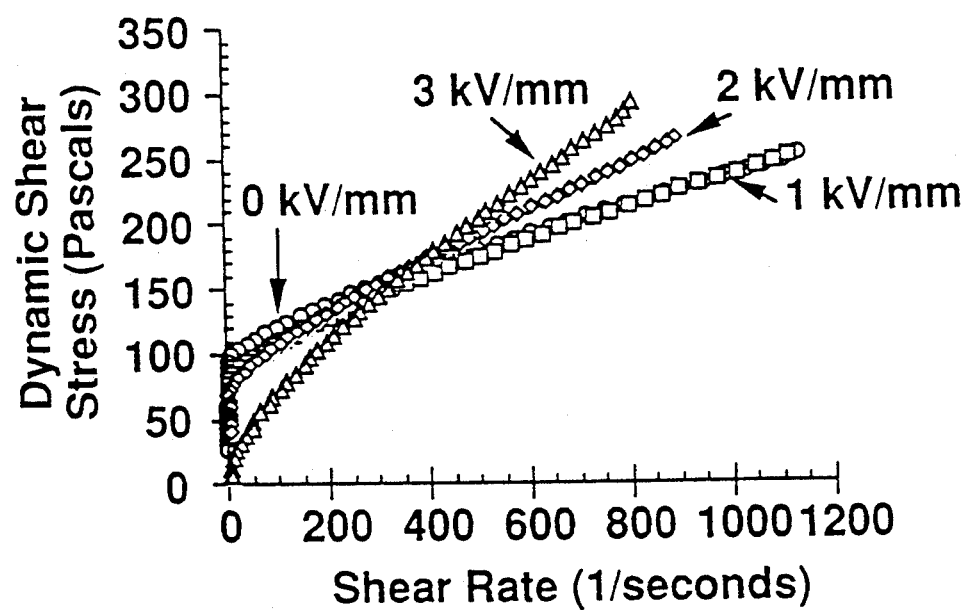
Figure 2(B) - Non-ionic Copper Phthalocyanine Based Material (Example 34)

IONIC DYE-BASED ELECTRORHEOLOGICAL MATERIALS

FIELD OF THE INVENTION

The present invention relates to fluid compositions that exhibit substantial changes in rheological properties when exposed to electric fields. More specifically, the present invention relates to an electrorheological material that utilizes an ionic dye or pigment as the active particle component.

BACKGROUND OF THE INVENTION

Electrorheological materials are fluid compositions that exhibit substantial changes in rheological properties in the presence of an electric field. Electrorheological materials typically consist of (1) a carrier fluid, (2) a particle component, (3) an activator, and (4) a surfactant. The surfactant of the electrorheological material is utilized to disperse the particle component within the carrier fluid while the activator is utilized to impart electroactivity to the particle component. In the presence of an electric field, the particle component becomes organized so as to increase the apparent viscosity or flow resistance of the overall fluid. Therefore, by manipulating the electric field, one can selectively change the apparent viscosity or flow resistance of an electrorheological material to achieve desired results in various known devices and applications.

Over the years, many different types of electrorheological materials have been developed that are based on numerous types of particle components. These previously developed electrorheological materials may be utilized in various devices, including dampers designed for controlling vibration of a system in either an on/off or continuously variable manner. In many instances, an electrorheological material can be selected in order to provide specific performance characteristics in the particular device or application selected. For example, in a device where it is necessary or desirable to see the inner workings of a device with the human eye, an optically transparent electrorheological material will be selected such as that disclosed in U.S. Pat. No. 5,075,021 entitled "Optically Transparent Electrorheological Fluid."

In certain other devices or applications where the electrorheological material is readily visible to an outside observer, it may be desirable to utilize an electrorheological material that has aesthetic shades of color. In fact, several electrorheological materials have been previously mentioned in the patent literature that utilize dyes or pigments as electrorheological materials. For example, U.S. Pat. No. 3,484,162 describes an electroviscous recording device wherein an electrorheological material is used to create images on a substrate by releasing the material onto the substrate in response to radiation from a lamp that energizes a photoconductive cell to short circuit an electric field that maintains the material in a viscous state. Since the electrorheological materials utilized in the device must have a dark or readily visible color, carbon black is employed as the particle component or a suitable dye or pigment is added to the electrorheological material. U.S. Pat. No. 3,484,162 discloses, as a specific example, a red electroviscous fluid containing Acetamine Rubine B and paraffin oil.

U.S. Pat. No. 3,553,708 discloses another electroviscous recording device wherein materials that exhibit changes in electroactivity in the presence of actinic radiation or light and an electric field are utilized in the electrorheological material. A constant electric field is applied to the electrorheological material and a lamp is utilized to release the electrorheological material at selected intervals in response to changes in radiation. The electrorheological materials utilize various dyes and pigments including phthalocyanine-type compounds such as copper phthalocyanine. The carrier liquid of the materials may be any dielectric liquid such as mineral oil, chlorinated hydrocarbons, fluorinated hydrocarbons, etc.

U.S. Pat. No. 4,687,589 describes an electrorheological material that utilizes as the particle component a substantially anhydrous electronic conductor such as an organic semiconductor comprised of unsaturated, fused polycyclic systems containing conjugated $\pi$-bonds. Specific examples of particle components include phthalocyanine-type compounds such as copper phthalocyanine, violanthrone B, porphin or azaporphin systems, poly(acene-quinone) polymers, and polymeric Schiff's Bases.

Previously developed electrorheological materials utilizing dyes and pigments such as those described above frequently suffer from various disadvantages. For example, the responsiveness of many dyes and pigments to an electric field is relatively sluggish so that the particular electrorheological material may exhibit an undesirable delay after exposure to an electric field. Additionally, electrorheological materials such as those disclosed in U.S. Pat. No. 3,553,708 require the presence of actinic radiation in addition to exposure to an electric field. Finally, substantially anhydrous electrorheological materials such as those disclosed in U.S. Pat. No. 4,687,589 have been found to require the use of an alternating current (A.C.) electric field to limit particle electrophoresis (the migration of the electrorheological particles towards one of the electrodes) which can interfere with electrorheological activity.

It is desirable in most electrorheological material applications such as on/off and continuously variable vibration damping, visual effects displays or the like, for an electrorheological material to exhibit a response to an electric field on a millisecond time scale. Since many applications do not lend themselves to open exposure to light, it also is desirable for an electrorheological material to exhibit an electrorheological response in the absence of actinic radiation. Due to the high cost and limited availability of A.C. high voltage power supplies, it is furthermore desirable that an electrorheological material be capable of being operated with direct current (D.C.) voltage. A need therefore exists for an electrorheological material which is based on a dye or pigment and which would exhibit a relatively fast response time, would not require the presence of light in order to exhibit an electrorheological effect, and would effectively operate with the application of D.C. voltage.

SUMMARY OF THE INVENTION

The present invention is an electrorheological material that is particularly useful in applications where it is desired to produce an aesthetic visual effect. The present material responds relatively quickly to an electric field, does not require the presence of actinic radiation in order to exhibit activity, and can be operated with D.C. voltage, as well as A.C. voltage.

It has presently been discovered that certain ionic dyes are surprisingly effective when utilized as the particle component of an electrorheological material. More specifically, the electrorheological material of the present invention comprises a carrier fluid component and an ionic dye particle component. The present electrorheological material may optionally contain an activator such as water or other molecule-containing hydroxyl, carboxyl or amine functionality and may also optionally contain a surfactant. The ionic dyes of the invention can be utilized in combination with other electrorheological particles and are capable of providing aesthetic hues or colors that are useful in applications wherein the electrorheological material is visible to an outside observer. The material responds relatively quickly to an electric field of A.C. or D.C. voltage and can be utilized in the absence of actinic radiation.

BRIEF DESCRIPTION OF THE DRAWINGS

FIG. 1(A) is a graph showing the electric field versus dynamic yield stress for the ionic dye-based electrorheological materials of Examples 19, 20, 27, 29 and 30.

FIG. 1(B) is a graph showing the electric field versus dynamic yield stress for the non-ionic dye-based electrorheological materials of Examples 22, 23, 28, 31 and 32.

FIG. 2(A) is a graph showing shear rate versus dynamic shear stress and the corresponding dynamic yield stress values for the ionic dye-based electrorheological material of Example 33.

FIG. 2(B) is a graph showing shear rate versus dynamic shear stress and the corresponding dynamic yield stress values for the non-ionic dye-based electrorheological material of Example 34.

DETAILED DESCRIPTION OF THE INVENTION

The present invention relates to an electrorheological material comprising a carrier fluid component and an ionic dye particle component.

The carrier fluid of the invention is a continuous liquid phase and may be selected from any of a large number of electrically insulating, hydrophobic liquids known for use in electrorheological materials. Typical liquids useful in the present invention include mineral oils, white oils, paraffin oils, chlorinated hydrocarbons such as 1-chlorotetradecane, silicone oils, transformer oils, halogenated aromatic liquids, halogenated paraffins, polyoxyalkylenes, perfluorinated polyethers, fluorinated hydrocarbons and mixtures thereof. Perfluorinated polyethers, silicone and hydrocarbon oils having viscosities of between about 0.65 and 1000 milli Pascal seconds (mPa·s) are the preferred carrier fluids of the invention. As known to those familiar with such compounds, transformer oils refer to those liquids having characteristic properties of both electrical and thermal insulation. Naturally occurring transformer oils include refined mineral oils that have low viscosity and high chemical stability. Synthetic transformer oils generally comprise chlorinated aromatics (chlorinated biphenyls and trichlorobenzene), which are known collectively as "askarels", silicone oils, and esteric liquids such as dibutyl sebacates. The carrier fluid is utilized in an amount ranging from about 20 to 97, preferably from about 35 to 90 percent by weight of the final electrorheological material.

The ionic dye compounds that function as the particle component of the present electrorheological material can essentially be any ionically charged compound based on, or derived from, a conjugated hydrocarbon compound such as an aromatic compound. The conjugated compound should contain an extended system of $\pi$ electrons that will allow absorption of light in the visible regions. The ionic dye compound of the invention can therefore be any known conjugated dye or pigment compound that contains an ionic charge. The ionic charge is typically present in the form of a cationic or anionic salt. In the case of a cationic salt, the conjugated system typically contains a positive charge that is offset with a negatively charged ion such as a halide ion ($F^-$, $Cl^-$, $Br^-$, $I^-$), $HSO_4^-$ or the like. In the case of an anionic salt, the conjugated system typically contains a negative charge that is offset by a positively charged ion such as $Na^+$, $K^+$, or the like.

So long as the compound contains an ionic charge as described above, the dye or pigment compound of the present invention can be selected from any of the well-known classes of dyes including phthalocyanine, metal complex, nitroso, nitro, monoazo, disazo, trisazo, polyazo, azoic, stilbene, diphenylmethane, triarylmethane, xanthene, acridine, quinoline, methine, thiazole, indamine, azine, oxazine, thiazine, sulphur, lactone, anthroquinone and indigoid classes. A detailed description of dyes from these classes can be found in E. N. Abrahart's *Dyes and Their Intermediates*, Chemical Publishing, New York, 1977 (hereinafter referred to as Abrahart), the entire disclosure of which is incorporated herein by reference.

The ionic dye compounds of the present invention preferably contain at least one aromatic nucleus that has been sulfonated and/or carboxylated to form a negatively charged system which has, in turn, been offset with a positive ion such as $Na^+$ in order to form a salt. The preferred sulfonated and carboxylated derivatives of aromatic-containing dye compounds of the invention can be prepared by sulfonating and/or carboxylating the aromatic nucleus by methods well known in the art, such as the methods described on pages 43 and 62 of Abrahart. Sulfonated and carboxylated derivatives of azo dyes are particularly well known and are described on pages 92–107 of Abrahart.

Examples of ionic dye compounds suitable for use in the present invention are given below. The dye compounds are listed with their commercial name followed by the Colour Index (C.I.) number in parenthesis. The Colour Index system was set up under the joint sponsorship of the American Association of Textile Chemists and Colourists (AATCC) in the United States and the Society of Dyers and Colourists in Great Britain. Volumes I, II, III, and IV of the well-known Colour Index are incorporated herein by reference. The complete structures of the following compounds can be found in Abrahart (pp. 92–107) and in the 1990–1991 Aldrich Catalog Handbook of Fine Chemicals, Aldrich Chemical Company, Inc., Milwaukee, 1990, which is also incorporated herein by reference.

Examples of ionic dye compounds useful in the present invention include Naphthol Green B (10020), Naphthol Yellow S (10316), Orange II (15510), Mordant Yellow 10 (14010), Brilliant Crocein MOO (27290), Fast Blue BB salt (37155), Brilliant Green (42040), Trisodium salt of Aurintricarboxylic acid (43810), Eosin Y (45380), Basic Yellow 11 (48055), Basic Yellow 11 (48055), Primulin (49000), Acid Green 25 (61570), Indigo Carmine (73015), Tetrasodium salt of Copper Phthalocyanine-tetrasulfonic acid (74160-Copper Phthalocyanine), Acid Red 74 (13355), Acid Blue 135 (13385), Acid Red 14 (14720), Mordant Black 11

(14645), Mordant Black 1 (15710), Acid Red 25 (16050), Acid Orange 10 (16230), Direct Red 70 (16081), Acid Red 29 (16570), Acid Black 31 (17580), Acid Blue 6 (17185), Mordant Black 38 (18160), Direct Orange 75 (17840), Direct Red 65 (17870), Acid Yellow 17 (18965), Acid Yellow 23 (19140), Mordant Red 7 (18760), Mordant Orange 26 (19325), Acid Red 214 (19355), Direct Orange 18 (20215), Orange II (15510), Acid Black 17 (20350), Direct Brown 2, (22311), Direct Blue 1 (24410), Acid Red 99 (23285), Acid Yellow 42 (22910), Rosolic Acid (43800), Direct Yellow 12 (24895), Direct Red 81 (28160), Acid Red 148 (26665), Direct Yellow 49 (29035), Direct Red 23 (29160), Direct Black 38 (30235), Direct Brown 54 (31735), Direct Blue 71 (34140), Direct Blue 78 (34200), Direct Red 80 (35780), Naphthol Yellow S (10316), Martius Yellow Sodium Salt (10315), Acridine Orange (46005), and Fast Blue RR Salt (37155).

Several of the preferred sulfonated and carboxylated salt derivatives of the present invention are illustrated below by Structures (I)–(VI). A particularly preferred particle component for the present electrorheological material is the tetrasodium salt of the sulfonated derivative of copper phthalocyanine shown by Structure (I). In Structure (I), $R_1$–$R_4$ can independently be H or $SO_3Na$ with the proviso that one of $R_1$–$R_4$ is $SO_3Na$ with the other three R groups being H. It has been found that this compound exhibits excellent electrorheological activity.

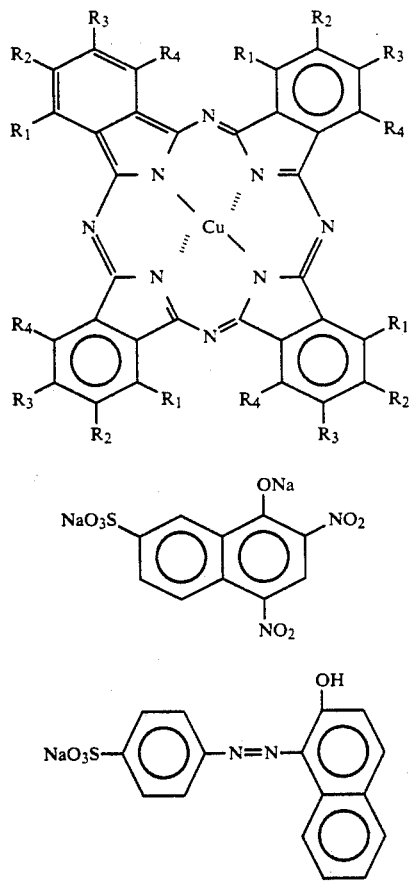

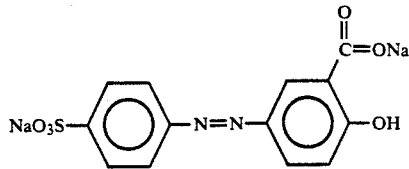

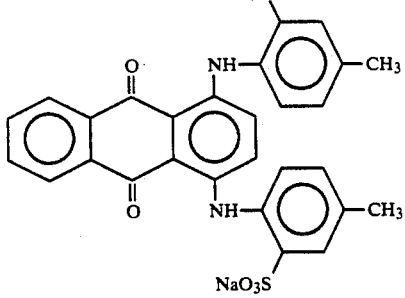

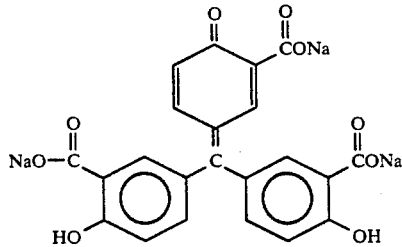

(I) = Tetrasodium salt of Copper Phthalocyanine tetrasulfonic acid
(II) = Naphthol Yellow S (10316)
(III) = Orange II (15510)
(IV) = Mordant Yellow 10 (14010)
(V) = Acid Green 25 (61570)
(VI) = Trisodium salt of Aurintricarboxylic acid The ionic dye particle component typically comprises from about 3 to 80, preferably from about 10 to about 65, percent by weight of the total electrorheological material, depending on the specific particle being used, the desired electroactivity, and the viscosity of the overall fluid. The particular amount of particle component required in individual materials will be apparent to those skilled in the art.

The ionic dye particle component may advantageously be utilized in an anhydrous form by removing adsorbed water through heat treatment prior to formulation of the electrorheological material. Adsorbed water is typically removed by drying the particles in a convection oven for a period of time ranging from about 3 to 48 hours at a temperature between about 110° C. and 150° C. The utilization of the dye particles in anhydrous form is advantageous in that it decreases the conductivity of the resulting electrorheological material and subsequently lowers the power consumption of the devices utilizing the material.

The ionic dye particles may also be utilized in a non-anhydrous form by utilizing a small amount of activator in combination with the particle component. Typical activators for optional use in the present invention include water and other molecules containing hydroxyl, carboxyl or amine functionality. Typical activators other than water include methyl, ethyl, propyl, isopropyl, butyl and hexyl alcohols, ethylene glycol, diethylene glycol, propylene glycol, glycerol; formic, acetic, sulfuric and lactic acids; aliphatic, aromatic and heterocyclic amines, including primary, secondary and tertiary amino alcohols and amino esters that have from 1-16 atoms of carbon in the molecule; methyl, butyl, octyl, dodecyl, hexadecyl, diethyl, diisopropyl and dibutyl amines, ethanolamine, propanolamine, ethoxyethylamine, dioctylamine, triethylamine, trimethylamine, tributylamine, ethylene-diamine, propylene-diamine, triethanolamine, triethylenetetramine, pyridine, morpholine and imidazole; and mixtures thereof. Water is the preferred activator for optional use in the present invention. When employed, the activator is utilized in an amount from about 0.1 to about 10, preferrably from about 0.5 to about 5.0, percent by weight relative to the weight of the particle component.

A surfactant to disperse the particle component may also be utilized in the present invention. Such surfactants include known surfactants or dispersing agents such as glycerol monooleate, sorbitan sesquioleate, stearates, laurates, fatty acids, fatty alcohols, and the other surface active agents discussed in U.S. Pat. No. 3,047,507 (incorporated herein by reference) but preferably comprise non-ionic surfactants such as the steric stabilizing amino-functional, hydroxy-functional, acetoxy-functional, or alkoxy-functional polysiloxanes such as those disclosed in U.S. Pat. No. 4,645,614 (incorporated herein by reference). Other steric stabilizers such as graft and block copolymers may be utilized as a surfactant for the present invention and such other steric stabilizers as, for example, block copolymers of poly(ethylene oxide) and poly(propylene oxide) are disclosed in detail in U.S. Pat. No. 4,772,407 (incorporated herein by reference) and in Napper, "Polymeric Stabilization of Colloidal Dispersions," Academic Press, London, 1983. Still other steric stabilizers include hyperdispersants such as HYPERMER ® (ICI Americas, Inc.) and SOLSPERSE ® (ICI Americas, Inc.) hyperdispersants, and fluoroaliphatic polymeric esters such as FC-430 (3M Corporation).

The surfactant, if utilized, is preferably an amino-functional polydimethylsiloxane, a fluoroaliphatic polymeric ester, or hyperdispersant. The optional surfactant may be employed in an amount ranging from about 0.1 to 20 percent by weight relative to the weight of the particle component.

The electrorheological materials of the present invention can be prepared by simply mixing together the carrier fluid, the particle component and any activator and/or surfactant. If water is used as an activator, the corresponding electrorheological material is preferably prepared by drying the particle component in a convection oven at a temperature of from about 110° C. to about 150° C. for a period of time from about 3 hours to about 48 hours and subsequently allowing the particle component to absorb the desired amount of water from the atmosphere. The ingredients of the electrorheological materials may be initially mixed together by hand with a spatula or the like and then subsequently more thoroughly mixed with a mechanical mixer or shaker, or dispersed with an appropriate milling device such as a ball mill, sand mill, attritor mill, paint mill, etc., in order to create smaller particles and a more stable suspension.

Evaluation of the mechanical/electrical properties and characteristics of the electrorheological materials of the present invention, as well as other electrorheological materials, can be carried out by directing the fluids through a defined channel, the sides of which form parallel electrodes with definite spacing therebetween. A pressure transducer measures the pressure drop between the entry and exit ends of the flow channel as a function of applied voltage. By keeping flow rates low, the viscous contribution to the pressure drop is kept negligible. Induced yield stress (T) is calculated according to the following formula:

$$T = P\left(\frac{B}{2L}\right)$$

where P represents the pressure drop, L is the length of the channel and B is the electrode spacing. The numerical constant 2 is generally valid for the normally encountered ranges of flow rates, viscosities, yield stresses and flow channel sizes. In its strictest sense, this constant can have a value between 2 and 3, a detailed discussion of which is given in R. W. Phillips "Engineering Applications of Fluids With a Variable Yield Stress," Ph.D. Thesis, University of California, Berkley, 1969.

Another method used to evaluate the mechanical/electrical properties of the electrorheological materials of the present invention includes concentric cylinder couette rheometry. The theory which provides the basis for this technique is adequately described by S. Oka in *Rheology, Theory and Applications* (volume 3, F. R. Eirich, ed., Academic Press: New York (1960), pages 17-82) which is incorporated herein by reference. The information that can be obtained from a concentric cylinder rheometer includes data relating mechanical shear stress to shear strain, the static yield stress and the electrical current density as a function of shear rate. For electrorheological materials, the shear stress versus shear rate data can be modeled after a Bingham plastic in order to determine the dynamic yield stress and viscosity. The test geometry that is utilized by these rheometers for the characterization of ER materials is a simple concentric cylinder couette cell configuration. The material is placed in the annulus formed between an inner cylinder of radius $R_1$ and an outer cylinder of radius $R_2$. One of the cylinders is then rotated with an angular velocity W while the other cylinder is held motionless. The relationship between the shear stress and the shear strain rate is then derived from this angular velocity and the torque, T, applied to maintain or resist it.

Two methods were used to determine the response times associated with electrorheological materials of the present invention. Both of these methods are described in detail in a paper by Weiss and Carlson presented on Oct. 16, 1991 at the 3rd International Conference on ER Fluids (Carbondale, Ill.) the entire disclosure of which is incorporated herein by reference. The first technique, which is based upon dielectric or impedance spectroscopy, allows for the measurement of the time necessary for individual particles to respond to a small change in electric field. In this technique, data describing the electrical response of a material is obtained through the application of a small alternating current signal to the sample over a broad frequency range. Analysis of this data using circuit theory provides a description of the material's dielectric properties. It is known that electrorheological materials undergo a Debye-like relaxation process. According to Debye theory the time dependent dielectric data obtained for an electrorheological material using impedance spectroscopy can be used to determine the relaxation time associated with the polarization decay process. This relaxation time for an electrorheological material can be obtained either at the angular frequencies where maxima are observed in the dielectric loss and/or loss tangent data or through the use of Cole-Cole arc diagrams. This measurement provides a lower limit for the time interval in which an electrorheological material response can be expected. In other words, the electrorheological material can never exhibit a response to an electric field faster than the relaxation time indicated by this measurement.

The second technique is based on the previously described custom designed, defined channel, fixed-electrode, channel-flow rheometer. The measurement obtained by this technique corresponds to an upper limit for the time interval necessary for an electrorheological material to reach its maximum control ratio. The actual time constant associated with this flow measurement is taken to be the amount of time necessary for the pressure to increase from the voltage-off base line pressure to 63% of the final, voltage-on equilibrium pressure. While this time constant is related to the electrical time constant determined from the impedance spectroscopy measurements it includes additional time necessary for macroscopic structure formation in the material as well as any time needed to accommodate mechanical compliance in the test fixture. The overall "turn-on" time of an electrorheological material is generally taken to be 2-3 time constants. The response time measured using this technique is observed to closely approximate the value obtained in an actual working device.

The following examples are given to illustrate the invention and should not be construed to limit the scope of the invention.

EXAMPLE 1

An ionic dye-based electrorheological material is prepared by combining 10.0 g of Acid Green 25 (61570), 1.0 g of a polymeric hyperdispersant (SOLSPERSE® 17000—ICI Americas, Inc.), and 90.0 g of a perfluorinated polyether (GALDEN D-10—Montefluos S.p.A./Montedison U.S.A.). The resulting mixture is thoroughly mixed in a high speed paint mixer (model 5500, Red Devil, Inc.) for 30 minutes.

EXAMPLES 2-10

Electrorheological materials are prepared according to Example 1 except that 10.0 g of the following ionic dyes are utilized:

| Example | Ionic Dye |
|---------|-----------|
| 2 | Orange II (15510) |
| 3 | Mordant Yellow 10 (14010) |
| 4 | Naphthol Yellow S (10316) |
| 5 | Martius Yellow Sodium Salt (10315) |
| 6 | Brilliant Green (42040) |
| 7 | Aurin Tricarboxylic Acid Sodium Salt (43810) |
| 8 | Eosin Y (45380) |
| 9 | Indigo Carmine (73015) |
| 10 | Copper Phthalocyanine, Tetrasulfonic Acid Sodium Salt (74160) |

COMPARATIVE EXAMPLES 11-18

For comparative purposes, electrorheological materials based on non-ionic dye particles are prepared in accordance with Example 1 utilizing 10.0 grams of the following non-ionic dye particles:

| Example | Non-ionic Dye |
|---------|---------------|
| 11 | Solvent Green 3 (61565) |
| 12 | Mordant Orange I (14030) |
| 13 | Oil Red O (26125) |
| 14 | Martius Yellow Base (10315) |
| 15 | Rosolic Acid (43800) |
| 16 | Eosin Y Spirit Soluble (45380) |
| 17 | Indigo (73000) |
| 18 | Copper Phthalocyanine (74160) |

The ionic and non-ionic dye particles utilized in Examples 1-18 are not dried prior to use and therefore contain ambient moisture physically adsorbed onto the particle surface.

The relaxation times of the electrorheological materials of Examples 1-18 are measured using dielectric spectroscopy and the results are summarized in Table 1. In all cases, the ionic dye-based electrorheological materials are found to be capable of responding to an electric field faster than the analogous non-ionic dye-based electrorheological materials. The relaxation times are determined using Cole-Cole are diagrams constructed from the measured dielectric properties.

TABLE 1

| Ionic Dye-based Materials | | Non-ionic Dye-based Materials | |
|---|---|---|---|
| Example | Relaxation Time (milliseconds) | Example | Relaxation Time (milliseconds) |
| 1 | $6.0 \times 10^{-3}$ | 11 | $6.2 \times 10^{1}$ |
| 2 | $6.2 \times 10^{0}$ | 12 | $>1.0 \times 10^{3}$ |
| 3 | $2.0 \times 10^{-2}$ | 13 | $3.0 \times 10^{2}$ |
| 4 | $7.6 \times 10^{0}$ | 14 | $8.4 \times 10^{2}$ |
| 5 | $1.0 \times 10^{1}$ | 15 | $>1.0 \times 10^{3}$ |
| 6 | $6.3 \times 10^{1}$ | 16 | $>1.0 \times 10^{3}$ |
| 7 | $8.5 \times 10^{-1}$ | 17 | $>1.0 \times 10^{3}$ |
| 8 | $4.4 \times 10^{-2}$ | 18 | $>1.0 \times 10^{3}$ |
| 9 | $9.2 \times 10^{-1}$ | | |
| 10 | $1.1 \times 10^{-4}$ | | |

The ionic and non-ionic dye particles utilized in the following Examples 19-24 are dried in a convection oven at 130° C. for 48 hours before formulation into electrorheological materials which are hereinafter referred to as anhydrous electrorheological materials.

EXAMPLE 19

An anhydrous ionic dye-based electrorheological material is prepared by combining 17.1 g of Acid Green 25 (61570), 1.7 g of a polymeric hyperdispersant (SOLSPERSE 7000—ICI Americas, Inc.), and 153.9 g of a perfluorinated polyether (GALDEN D-10—Montefluos S.p.A./Montedison U.S.A.). The resulting mixture is thoroughly mixed in a SZEGVARI ATTRITOR® Mill System (Union Process Inc.) for 60 minutes.

EXAMPLES 20-21

Anhydrous ionic dye-based electrorheological materials are prepared according to Example 19 except that 8.7 g of Orange II (15510), 0.9 g of dispersant and 78.3 g of oil are utilized for Example 20; while 22.5 g of copper phthalocyanine, tetrasulfonic acid sodium salt (74160), 2.3 g of dispersant and 202.0 g of oil are utilized for Example 21.

COMPARATIVE EXAMPLES 22-24

Anhydrous non-ionic dye-based electrorheological materials are prepared according to Example 19 utilizing 24.7 g of Solvent Green 3 (61565), 16.6 g of Oil Red O (26125), and 16.4 g of copper phthalocyanine (74160) for Examples 22-24, respectively. In each of Examples 22-24, the amount of dispersant utilized is equivalent to 10 percent of the particle weight and the amount of oil utilized is equivalent to 9 times the particle weight.

The relaxation times for the anhydrous materials of Examples 19-24 are measured by impedance spectroscopy and the results are set forth in Table 2. Reduction in the ambient moisture adsorbed on the dye pigments prior to preparation of the ER fluids was found to increase the relaxation time associated with all electrorheological materials as indicated by a comparison of the data provided in Tables 1 and 2. Although the relaxation time increased for all materials, the electrorheological materials containing the ionic dye particles still respond to an electric field considerably faster than their non-ionic counterparts.

TABLE 2

| Ionic Dye-based Materials (Anhydrous) | | Non-ionic Dye-based Materials (Anhydrous) | |
|---|---|---|---|
| Example | Relaxation Time (milliseconds) | Example | Relaxation Time (milliseconds) |
| 19 | $1.2 \times 10^{-1}$ | 22 | $4.3 \times 10^2$ |
| 20 | $7.5 \times 10^0$ | 23 | $>1.0 \times 10^3$ |
| 21 | $9.2 \times 10^0$ | 24 | $>1.0 \times 10^3$ |

CHANNEL FLOW FIXTURE MEASUREMENTS

The single time constant response times for several of the electrorheological materials prepared in Examples 1-24, as well as the materials prepared in Examples 25, 26, 27 and 28 below, are measured using a channel flow fixture. The results of this analysis are summarized in Table 3. The measured time constants for electrorheological materials containing ionic dye particles were found to be considerably smaller than those measured for the corresponding non-ionic dye-based electrorheological materials. The actual time constant associated with this flow measurement is taken to be the amount of time necessary for the pressure to increase from the voltage-off base line pressure to 63% of the final, voltage-on equilibrium pressure. The overall "turn-on" time of an electrorheological material is generally taken to be 2-3 time constants. As can be seen in Table 3, the response times for ionic dye-based materials are significantly faster than the response times for non-ionic dye-based materials as measured on a channel flow fixture.

EXAMPLE 25

An ionic dye-based electrorheological material is prepared according to Example 1 utilizing 10.0 g of Fast Blue RR salt (37155) as the ionic dye particle, 1.0 g of SOLSPERSE® 17000 dispersant and 90.0 g of GALDEN D-10 oil.

EXAMPLE 26

A non-ionic dye-based electrorheological material is prepared according to Example 1 utilizing 10.0 g of Fast Blue RR non-salt (37155) as the non-ionic dye particle, 1.0 g of SOLSPERSE® 1700 dispersant and 90.0 g of GALDEN D-10 oil.

EXAMPLE 27

An anhydrous ionic dye-based electrorheological material is prepared according to Example 19 utilizing 27.4 g of Eosin Y (45380) as the ionic dye particle, 2.7 g of SOLSPERSE® 17000 dispersant and 246.6 g of GALDEN D-10 oil.

EXAMPLE 28

An anhydrous non-ionic dye-based electrorheological material is prepared according to Example 19 utilizing 11.9 g of Eosin Y spirit soluble non-salt (45380) as the non-Ionic dye particle, 1.2 g of SOLSPERSE® 17000 dispersant and 107.1 g of GALDEN D-10 oil.

TABLE 3

| Ionic Dye-based Materials | | Non-ionic Dye-based Materials | |
|---|---|---|---|
| Example | Response Time (milliseconds) | Example | Response Time (milliseconds) |
| 19 | $3.0 \times 10^0$ | 22 | $1.0 \times 10^3$ |
| 20 | $8.0 \times 10^0$ | 23 | $1.7 \times 10^3$ |
| 25 | $8.0 \times 10^0$ | 26 | $>3.0 \times 10^3$ |
| 27 | $1.0 \times 10^1$ | 28 | $>2.5 \times 10^3$ |

EXAMPLES 29-32

Anhydrous ionic dye-based electrorheological materials are prepared according to Example 19 utilizing 17.5 g of Indigo Carmine (73015) and 9.3 g of Mordant Yellow 10 (14010) for Examples 29 and 30, respectively. Anhydrous non-ionic dye-based electrorheological materials are similarly prepared with 7.5 g of Acridine Orange Base (46005) and 10.4 g of Rosolic Acid (43800) for Examples 31 and 32, respectively. In each example, the amount of dispersant and oil utilized is equivalent to 0.1 and 9 times the particle weight, respectively.

The dynamic yield stress exhibited by the anhydrous ionic dye-based electrorheological materials of Examples 19, 20, 27, 29, and 30 are measured using the channel flow fixture, and the results are shown in FIG. 1A for various voltages of electric field. FIG. 1B shows analogous results for the non-ionic materials of Examples 22, 23, 28, 31, and 32. In general, the anhydrous ionic dye-based electrorheological materials exhibit a greater dynamic yield stress than electrorheological materials based on the non-ionic dye particles. The electrorheological material based on a non-ionic dye that demonstrated the highest dynamic yield stress was Example 22. The yield stress observed for this electrorheological material at 4.0 kV/mm was observed to be 140 Pascals. The corresponding electrorheological material of Example 19 based on the analogous ionic dye particle was observed to exhibit a much higher dynamic yield stress of 700 Pascals at 4.0 kv/mm. The particles utilized in Examples 22 and 19 are structurally similar but exhibit markedly different yield stresses due to the difference in ionic character.

EXAMPLES 33-34

An anhydrous ionic dye-based electrorheological material is prepared according to Example 19 utilizing 1250.0 g of copper phthalocyanine tetrasulfonic acid sodium salt (TSAS) (74160), 19.1 g of a fluoroaliphatic polymeric ester surfactant (FC-430—3M Corporation), and 2917.0 g of a perfluorinated polyether (GALDEN D-10—Montefluos S.p.A./Montedison U.S.A.) for Example 33. An anhydrous non-ionic dye-based electrorheological material is similarly prepared for Example 34 utilizing 58.0 g of copper phthalocyanine (74160), 0.9 g of the fluoroaliphatic polymeric ester dispersant, and 135.4 g of GALDEN D-10 oil.

The viscosity of the electrorheological material containing the copper phthalocyanine pigment was so high that the material had to be diluted with carrier fluid by 50% prior to testing. The dynamic shear stresses of these two electrorheological materials were measured as a function of shear rate at various D.C. voltages using a concentric cylinder couette cell rheometer and the results are shown in FIGS. 2A and 2B. The dynamic yield stresses ($\tau_{dynamic}$) for these materials are obtained from this data through the use of a Bingham plastic curve fit and are listed on FIGS. 2A and 2B. The dynamic yield stress in a Bingham plastic modeled electrorheological material is defined as corresponding to the zero-rate intercept of the linear regression curve fit and the yield stresses in FIGS. 2A and 2B are therefore the y-intercepts of each plotted line. As can be seen from FIGS. 2A and 2B, the dynamic yield stresses exhibited by the ionic TSAS are much greater than those of the non-ionic, non-sulfonated copper phthalocyanine counterpart.

It is understood that the foregoing is a description of the preferred embodiments of the present invention and that the scope of the invention is not limited to the specific terms and conditions set forth above but is determined by the following claims.

What is claimed is:

1. An electrorheological material comprising from about 20 to 97 percent by weight of an electrically insulating hydrophobic liquid as a carrier fluid and from about 3 to 80 percent by weight of an ionic dye particle component wherein the particle component contains at least one aromatic nucleus that has been sulfonated and/or carboxylated to form a negatively charged system which has, in turn, been offset with a positive ion in order to form a salt.

2. An electrorheological material according to claim 1 wherein the carrier fluid is selected from the group consisting of mineral oils, white oils, chlorinated hydrocarbons, silicone oils, halogenated aromatic liquids, polyoxyalkylenes, perfluorinated polyethers, fluorinated hydrocarbons and mixtures thereof.

3. An electrorheological material according to claim 2 wherein the carrier fluid is a perfluorinated polyether or a silicone or hydrocarbon oil having a viscosity of between about 0.65 and 1000 mPa·s.

4. An electrorheological material according to claim 1 wherein the particle component is selected from the group consisting of Naphthol Green B (10020), Naphthol Yellow S (10316), Orange II (15510), Mordant Yellow 10 (14010), Brilliant Crocein MOO (27290), Fast Blue BB salt (37155), Brilliant Green (42040), Trisodium salt of Aurintricarboxylic acid (43810), Eosin Y (45380), Basic Yellow 11 (48055), Basic Yellow 11 (48055), Primulin (49000), Acid Green 25 (61570), Indigo Carmine (73015), Tetrasodium salt of Copper Phthalocyanine-tetrasulfonic acid (74160-Copper Phthalocyanine), Acid Red 74 (13355), Acid Blue 135 (13385), Acid Red 14 (14720), Mordant Black 11 (14645), Mordant Black 1 (15710), Acid Red 25 (16050), Acid Orange 10 (16230), Direct Red 70 (16081), Acid Red 29 (16570), Acid Black 31 (17580), Acid Blue 6 (17185), Mordant Black 38 (18160), Direct Orange 75 (17840), Direct Red 65 (17870), Acid Yellow 17 (18965), Acid Yellow 23 (19140), Mordant Red 7 (18760), Mordant Orange 26 (19325), Acid Red 214 (19355), Direct Orange 18 (20215), Orange II (15510), Acid Black 17 (20350), Direct Brown 2, (22311), Direct Blue 1 (24410), Acid Red 99 (23285), Acid Yellow 42 (22910), Rosolic Acid (43800), Direct Yellow 12 (24895), Direct Red 81 (28160), Acid Red 148 (26665), Direct Yellow 49 (29035), Direct Red 23 (29160), Direct Black 38 (30235), Direct Brown 54 (31735), Direct Blue 71 (34140), Direct Blue 78 (34200), Direct Red 80 (35780), Naphthol Yellow S (10316), Martius Yellow Sodium Salt (10315), Acridine Orange (46005), and Fast Blue RR Salt (37155).

5. An electrorheological material according to claim 4 wherein the particle component is the tetrasodium salt of copper phthalocyanine tetrasulfonic acid.

6. An electrorheological material according to claim 1 wherein the particle component is utilized in an anhydrous form by removing adsorbed water through heat treatment prior to formulation of the electrorheological material.

7. An electrorheological material according to claim 6 wherein the adsorbed water is removed by drying the particles in a convection oven for a period of time ranging from about 3 to 48 hours at a temperature between about 110° C. and 150° C.

8. An electrorheological material according to claim 1 further comprising an activator.

9. An electrorheological material according to claim 8 wherein the activator is water and other molecules containing hydroxyl, carboxyl or amine functionality.

10. An electrorheological material according to claim 9 wherein the activator is selected from the group consisting of water, methyl, ethyl, propyl, isopropyl, butyl and hexyl alcohols, ethylene glycol, diethylene glycol, propylene glycol, glycerol; formic, acetic, sulfuric and lactic acids; aliphatic, aromatic and heterocyclic amines; and mixtures thereof.

11. An electrorheological material according to claim 10 wherein the activator is water.

12. An electrorheological material according to claim 1 further comprising a surfactant.

13. An electrorheological material according to claim 12 wherein the surfactant is selected from the group consisting of glycerol monooleate; sorbitan sesquioleate; stearates; laurates; fatty acids; fatty alcohols; steric stabilizing amino-functional, hydroxy-functional, acetoxy-functional, or alkoxy-functional polysiloxanes; block copolymers of poly(ethylene oxide) and poly(propylene oxide); hyperdispersants; and fluoroaliphatic polymeric esters.

14. An electrorheological material according to claim 13 wherein the surfactant is an amino-functional polydimethylsiloxane, a fluoro-aliphatic polymeric ester, or a hyperdispersant.

15. An electrorheological material according to claim 1 wherein the carrier fluid is present in an amount from about 35 to 90 percent by weight and the ionic dye particle component is present in an amount from about 10 to 65 percent by weight.

16. An electrorheological material according to claim 10 wherein the aliphatic, aromatic and heterocyclic amines are selected from the groups consisting of primary, secondary and tertiary amino alcohols and amino esters that have from 1-16 atoms of carbon in the molecule; methyl, butyl, octyl, dodecyl, hexadecyl, diethyl, diisopropyl and dibutyl amines, ethanolamine, propanolamine, ethoxyethylamine, dioctylamine, triethylamine, trimethylamine, tributylamine, .ethylene-diamine, propylene-diamine, triethanolamine, triethylene-tetramine, pyridine, morpholine and imidazole.

17. A method of activating an electrorheological material comprising applying an electric field to the electrorheological material which comprises from about 20 to 97 percent by weight of an electrically insulating hydrophobic liquid as a carrier fluid, and from about 3 to 80 percent by weight of an ionic dye particle component.

* * * * *